Sept. 22, 1953      C. W. BUTLER      2,653,031
TRAILER HITCH
Filed Nov. 9, 1951      2 Sheets-Sheet 1
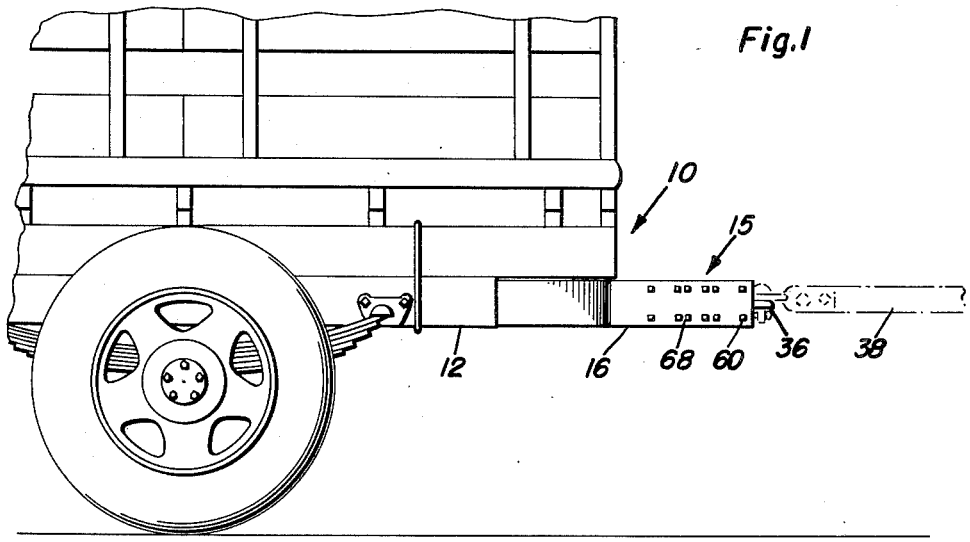
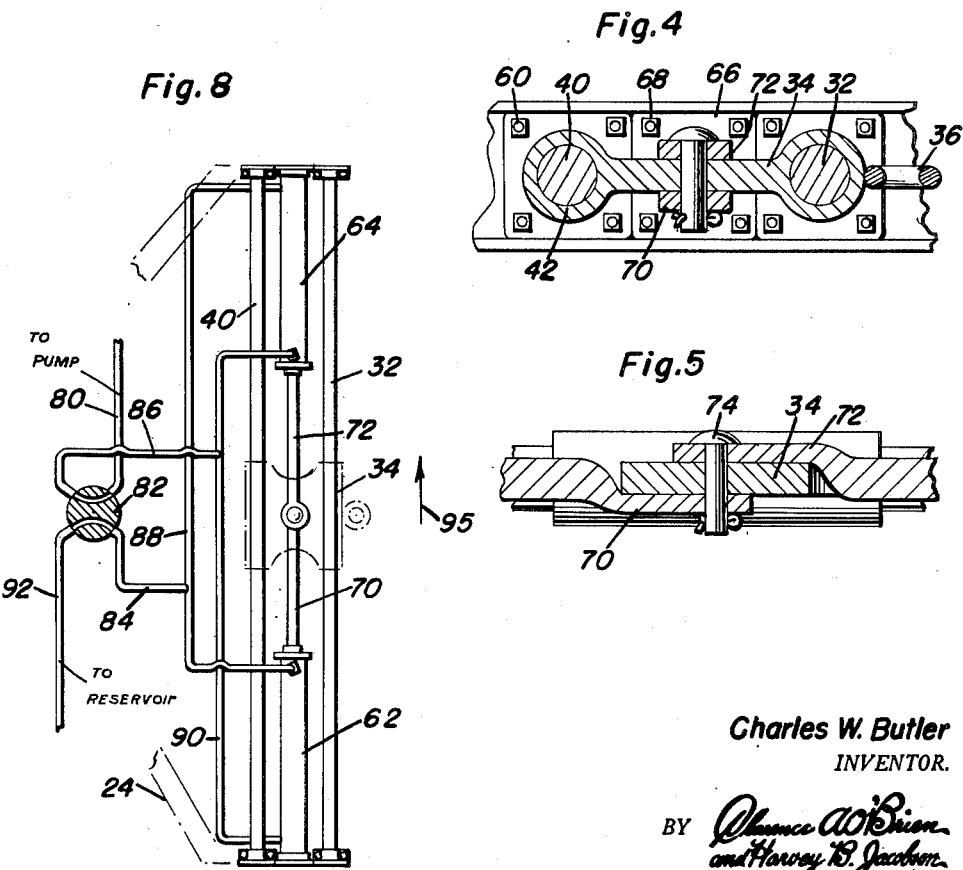
Charles W. Butler
INVENTOR.

Sept. 22, 1953

C. W. BUTLER 2,653,031

TRAILER HITCH

Filed Nov. 9, 1951

Charles W. Butler
INVENTOR.

BY *Clarence A. O'Brien*
*and Harvey B. Jacobson*
Attorneys

Patented Sept. 22, 1953

2,653,031

UNITED STATES PATENT OFFICE 2,653,031

TRAILER HITCH

Charles W. Butler, Arcadia, Calif., assignor of one-half to M. E. Barone, Arcadia, Calif.

Application November 9, 1951, Serial No. 255,626

2 Claims. (Cl. 280—33.1)

This invention relates to a trailer hitch and particularly to a hitch to be applied to the rear end of a conventional truck for the attachment of truck type trailers.

In the utilization of truck type trailers considerable difficulty has been experienced in steering or guiding the trucks behind the hauling vehicle. When the tongue or hitch of the trailer is connected to the central portion of the leading or pulling truck the trailing vehicle has a tendency to cut corners on curves. Also, when backing up the trailer any misalignment of the tongue or hitch with the axis of the trailer is immediately magnified by the rear of the trailer backwardly departing from the intended line of travel.

The present invention provides a hitch in which the point of contact between the trailer and the pulling vehicle may be changed at will so that the drawn vehicle may be steered or guided so that it will follow around curves or to correct any inaccuracy in the alignment of the vehicle.

This is accomplished by means of a transverse hitch bar having a hitch block slidably mounted on the hitch bar and means such as a pair of fluid cylinders for positioning the hitch block at any desired position along the hitch bar.

It is accordingly an object of this invention to provide an improved trailer hitch.

It is a further object of this invention to provide a trailer hitch in which the hitch point may be selectively located.

It is a further object of this invention to provide a hitch in which the hitch point is under the control of the leading vehicle.

Other objects and many of the attendant advantages of this invention will be apparent from the following detailed description taken in conjunction with the accompanying drawing, in which:

Figure 1 is a side elevational view of the hitch applied to a conventional truck;

Figure 4 is a cross section through the hitch taken substantially on the plane indicated by line 4—4 of Figure 2;

Figure 5 is a transverse section through the hitch plate taken substantially on the plane indicated by line 5—5 of Figure 2;

Figure 8 is a schematic diagram of connections for fluid control of the hitch.

Figure 2:
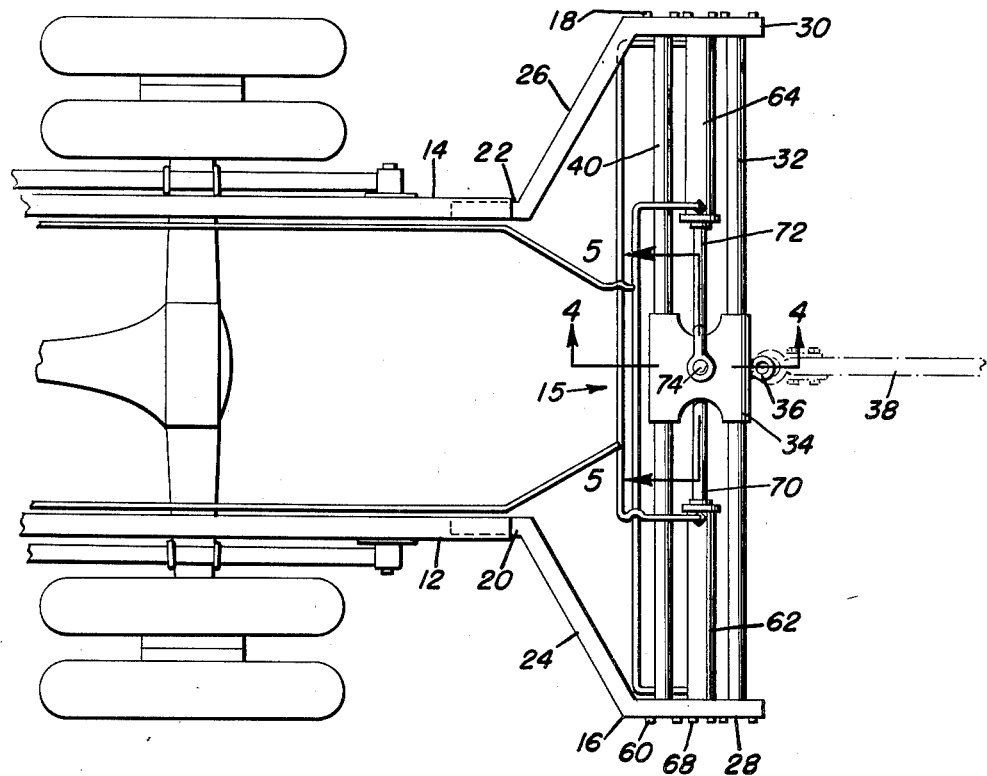
Figure 2 is a top plan view of the hitch applied on a chassis of a conventional truck.
Figure 3:
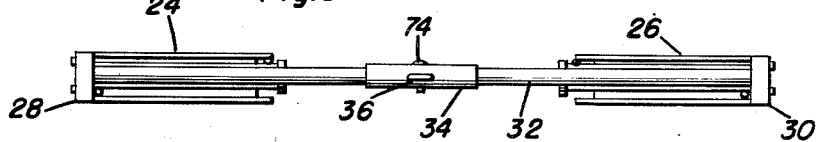
Figure 3 is a rear elevation of the hitch.
Figure 6:
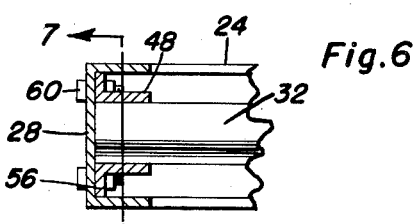
Figure 6 is an enlarged detail of the mounting of the hitch bars taken substantially on the plane indicated by the line 6—6 of Figure 7.
Figure 7:
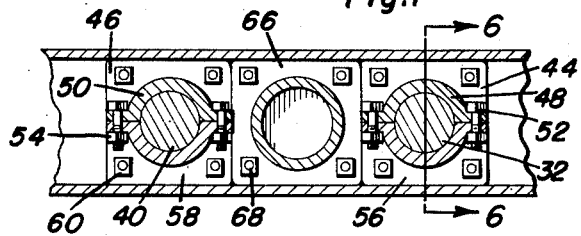
Figure 7 is an enlarged detail of a mounting of the hitch parts taken substantially on the plane indicated by the line 7—7 of Figure 6.

In the exemplary embodiment of the invention according to the drawing a conventional truck is indicated generally at 10, said truck having side bars 12 and 14 constituting the main portion of the frame of the vehicle.

The hitch of the present invention indicated generally at 15 is provided with a pair of side bars 16 and 18 which are mounted to constitute substantial extensions of the frame bars 12 and 14 of the conventional truck 10. The side bars 16 and 18 of the hitch arrangement are provided with substantially parallel forward ends 20 and 22 which preferably fit into and are rigidly connected to the rear ends of the frame bars 12 and 14 so as to form a substantial continuation or extension thereof. An intermediate flaring portion 24 and 26 extend outwardly laterally towards the sides of the truck so that the extensions 16 and 18 are flared outwardly to substantially the maximum width of the truck. Rearwardly extending substantially parallel ends 28 and 30 are provided on the extensions 16 and 18 for mounting of the hitch bars on the outer portion of the hitch 15.

A hitch bar 32 extends transversely between the ends 28 and 30 and is rigidly connected thereto. A hitch block 34 is slidably mounted on the hitch bar 32 and is provided with an eye or hitch 36 to which is connected the hitch or tongue of a trailing vehicle 38. A stabilizing hitch bar 40 is mounted between the ends 28 and 30 in spaced parallel relation to the main hitch bar 32 and the hitch block 34 is provided with a bore 42 slidably engaging the stabilizing bar 40 so that the block 34 is prevented from rotary motion about the bar 32. The hitch bar 32 and the stabilizing bar 40 are secured to the ends 28 and 30 by means of split collars 44 and 46, each of the split collars 44 and 46 is provided with an upstanding collar member 48 and 50 which embraces respectively the rods 32 and 40 and are rigidly secured thereto by means of clamp bolts 52 and 54. The split collars 44 and 46 are provided with substantially square end disks 56 and 58 which are secured to the ends 28 and 30 by means of suitable bolts 60 bolted on split collars provide a rigid secure connection between the hitch bars and the extension side members. This secure connection not only permits rigid operation of the hitch but also ready disassembly of the hitch to repair any portion that should be damaged in any accident or for wear or other reasons.

A pair of opposed cylinders 62 and 64 are mounted on the respective ends 28 and 30 by means of end plates 66 which are mounted into the end members 28 and 30 by means of bolts 68. The cylinders 62 and 64 are provided with pistons 70 and 72 which are secured to the sliding hitch block 34 by means of a pin 74.

The control system for the block 34 comprises a source of fluid pressure, not shown, and a reservoir to which the fluid may be pumped. A pump, not shown, supplies fluid pressure through a pressure line 80 which is controlled by means of a two-way valve 82 so that fluid pressure from the line 80 may be applied either through the line 84 or 86 to the opposite ends of the cylinders 62 and 64. The cylinders 62 and 64 are cross connected. That is, the inner end of cylinder 62 is connected to the outer end of cylinder 64 by means of a connection 88 connected to pipe 84 while the outer end of cylinder 62 is connected to the inner end of cylinder 64 by means of a conduit 90 connected to the conduit 86. Valve 82 selectively connects either the conduit 84 or 86 to the conduit 92 extending to the reservoir, not shown. Assuming it is desired to move the hitch block 34 to the upward position shown by the arrow 95 in Figure 8 the valve 82 would be adjusted to apply pressure through the conduit 86 to the connector 90 into the cylinders 62 and 64 so that the pistons 70 and 72 would move upwardly as shown by the arrow and cause the block to slide on the hitch rod 32 to produce a steering action on the vehicle indicated by the tongue 38.

In the operation of the hitch according to the invention a trailing truck is connected by means of the tongue 38 to the eye 36 of the hitch block 34 and the valve 82 is under control of the driver of the leading vehicle 10. For normal straight road traveling the hitch block 34 will be adjusted to the center of the hitch rod 32 and the valve 82 turned to neutral position so that the fluid in cylinders 62 and 64 will maintain the hitch block 34 in solid adjusted relation on the hitch bar 32. As the leading vehicle approaches a curve the operator of the leading vehicle will adjust the valve 82 to shift the hitch block 34 along the hitch bar 32 so that the trailing vehicle will be steered to follow around a curve instead of cutting the curve as has heretofore been customary. Likewise when maneuvering the trailer vehicle particularly when backing up it will be necessary to shift the hitch block 34 to keep the hitch or tongue 38 in complete and direct alignment with the axis of the trailing vehicle to prevent its being shunted to one side or the other during the backing up operation.

When air is used as the pressure fluid the return conduit 92 may be omitted and the control valve 82 vented directly to atmosphere.

Obviously the block 34 may be moved by means other than a fluid cylinder, as for example a screw engaging a nut secured to the block. The screw being rotated either by gears connected to the power system of the vehicle or by an electric motor drive.

While for purposes of illustration a particular embodiment of the invention has been shown and described according to the best present understanding thereof, it will be apparent that many changes and modifications can be made therein, without departing from the true spirit of the invention.

Having described the invention, what is claimed as new is:

1. A trailer hitch comprising side bars, a hitch bar connected transversely of said side bars, a hitch block slidably mounted on said hitch bar, a pair of opposed fluid operated cylinders mounted on said side bars, a piston in each of said cylinders, said pistons being connected to said hitch block, a source of fluid pressure, conduit means connecting said source to said cylinders, valve means controlling application of said pressure in said cylinders to position said block on said bar, said cylinders being cross connected whereby both cylinders are simultaneously effective to move the block.

2. A trailer hitch comprising diverging extensions secured to the frame of a vehicle, substantially parallel ends on said extensions, a hitch bar secured between said ends, a hitch block slidably mounted on said hitch bar, a stabilizing rod secured in parallel relation to said hitch bar, said hitch block slidably engaging said stabilizing rod, a pair of fluid cylinders mounted on the respective ends between said hitch bar and said stabilizing bar, pistons in said cylinders, said pistons being connected to said hitch block, means for applying fluid pressure in said cylinders to selectively locate said hitch block on said hitch rod, said cylinders being cross connected whereby said pair of cylinders simultaneously act in the same direction.

CHARLES W. BUTLER.

References Cited in the file of this patent

UNITED STATES PATENTS

| Number | Name | Date |
|---|---|---|
| 2,167,943 | Fox | Aug. 1, 1939 |
| 2,252,660 | Kulikoff | Aug. 12, 1941 |
| 2,557,471 | Romig et al. | June 19, 1951 |